United States Patent
Wu et al.

(10) Patent No.: US 11,523,102 B2
(45) Date of Patent: Dec. 6, 2022

(54) GRIDS FOR LED DISPLAYS

(71) Applicant: HEWLETT-PACKARD DEVELOPMENT COMPANY, L.P., Spring, TX (US)

(72) Inventors: Kuan-Ting Wu, Taipei (TW); Wei-Chung Chen, Taipei (TW); Hsing-Hung Hsieh, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 198 days.

(21) Appl. No.: 16/770,477

(22) PCT Filed: Dec. 6, 2017

(86) PCT No.: PCT/US2017/064828
§ 371 (c)(1),
(2) Date: Jun. 5, 2020

(87) PCT Pub. No.: WO2019/112574
PCT Pub. Date: Jun. 13, 2019

(65) Prior Publication Data
US 2021/0168349 A1 Jun. 3, 2021

(51) Int. Cl.
*H04N 13/32* (2018.01)
*G09F 9/33* (2006.01)
*G09F 9/37* (2006.01)

(52) U.S. Cl.
CPC ............. *H04N 13/32* (2018.05); *G09F 9/33* (2013.01); *G09F 9/37* (2013.01); *H04N 2213/001* (2013.01)

(58) Field of Classification Search
USPC ........................................................ 348/51
See application file for complete search history.

(56) References Cited

U.S. PATENT DOCUMENTS

| | | | |
|---|---|---|---|
| 7,692,733 B2 | 4/2010 | Daiku | |
| 8,571,993 B2 | 10/2013 | Kocher | |
| 9,128,387 B2 | 9/2015 | Shih et al. | |
| 9,255,673 B2 | 2/2016 | Horn et al. | |
| 9,348,160 B2 | 5/2016 | Hsu | |
| 10,789,910 B2 * | 9/2020 | Aurongzeb | G09G 3/3426 |
| 2010/0225639 A1 * | 9/2010 | Kubis | G09F 9/33 |
| | | | 345/82 |

(Continued)

FOREIGN PATENT DOCUMENTS

| | | | | |
|---|---|---|---|---|
| EP | 2434476 A1 | 3/2012 | | |
| EP | 3210072 A2 | 8/2017 | | |
| JP | 2016190151 A * | 11/2016 | | A63F 7/02 |

OTHER PUBLICATIONS

Unique Led Design Allows for More Focused Light Angle for High-intensity Applications, Apr. 22, 2014, http://www.lumex.com/unique-led-design-allows-for-more-focused-light-angle-for-high-intensity-applications.

*Primary Examiner* — Behrooz M Senfi
(74) *Attorney, Agent, or Firm* — HP Inc. Patent Department

(57) ABSTRACT

In example implementations, an apparatus is provided. The apparatus includes a movable light emitting diode (LED) base. A plurality of LED arrays is coupled to the movable LED base. The apparatus includes a grid that includes a plurality of walls. The grid is positioned such that each LED array of the plurality of LED arrays is adjacent to a wall of the plurality of walls.

11 Claims, 4 Drawing Sheets

(56) References Cited

U.S. PATENT DOCUMENTS

| | | |
|---|---|---|
| 2016/0282644 A1 | 9/2016 | Lin |
| 2017/0263208 A1* | 9/2017 | Imai ........................ G09G 5/373 |
| 2020/0124786 A1* | 4/2020 | Heo .................. G02F 1/133514 |
| 2020/0241284 A1* | 7/2020 | Wu ........................... G09G 3/32 |
| 2021/0240020 A1* | 8/2021 | Chang ............... G02F 1/133608 |

* cited by examiner

GRIDS FOR LED DISPLAYS

BACKGROUND

Computing devices use displays to display information. The display may generate text images, graphical images, videos, and the like. The images on the display may contain personal, confidential, or sensitive information.

People may use the computing devices in a variety of different areas that may be public or private. In a private area what the person is viewing may not matter, but in a public area the person may not want other people viewing the information on the display.

DETAILED DESCRIPTION

Examples described herein provide a display having an array of light emitting diodes (LEDs) on a movable LED base in conjunction with a grid that can enable a privacy mode. As discussed above, displays may be used with computing devices in a variety of different areas. In a public area, a user may want to enable a privacy mode to prevent other people from viewing his or her display.

Examples described herein provide a display that includes a grid that surrounds arrays of LEDs on a movable LED base. The movable LED base may be moved up and down in a z-direction to change a viewing angle of the LED arrays. For example, as the LEDs are moved below walls of the grid, the angle of light that is emitted from each LED of the LED array may be become narrower. As the angle of visible light emitted from each LED becomes narrower, the images on the display may be less visible at wider angles, such that the images can be best viewed directly in front of the display when a privacy mode is enabled.

Figure 1:
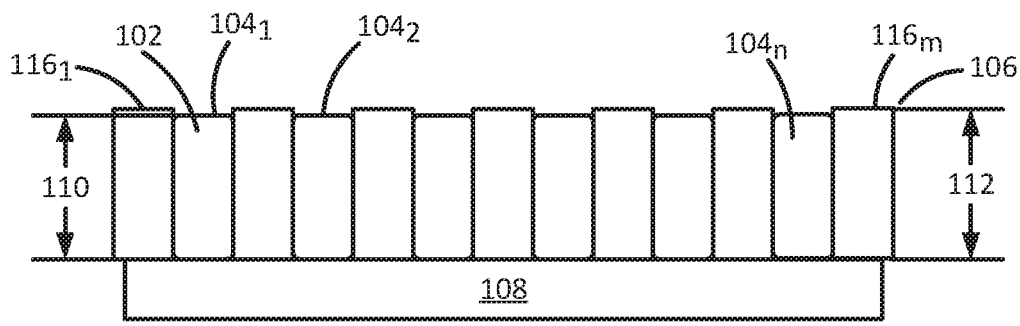
FIG. 1 is a block diagram of an example of an apparatus of the present disclosure in a non-privacy mode.

FIG. 1 illustrates an apparatus 100 of the present disclosure. The apparatus 100 may be a display module that is part of a monitor or display. For example, the display module may be deployed within a housing of a monitor and behind a viewing glass of the monitor. Additional components may be included in the monitor in addition to the apparatus 100 that are not shown (e.g., a power module, a controller, interfaces, and the like).

In one example, the apparatus 100 may include LEDs 102 arranged in a plurality of arrays 104$_1$ to 104$_n$ (hereinafter also referred to individually as an array 104 or collectively as arrays 104). Each array 104 of LEDs 102 may include at least one LED 102. In one example, each array 104 of LEDs 102 may be adjacent to a wall 116$_1$ to 116$_m$ (hereinafter also referred to individually as a wall 116 or collectively as walls 116) of a grid 106 that surrounds the LED arrays 104. In one example, each LED array 104 may be adjacent to at least two walls 116 of the grid 106.

In one example, the grid 106 may be fabricated from a reflective or opaque material. The grid 106 may be a metal, plastic, or metalized plastic. In one example, the walls that are adjacent to the LEDs 102 may be one type of material and the remaining portions of the grid 106 may be another type of material. For example, to reduce costs the walls 116 may be coated with reflective or opaque coating or material, while remaining portions of the grid 106 may be any type of material.

Figure 3:
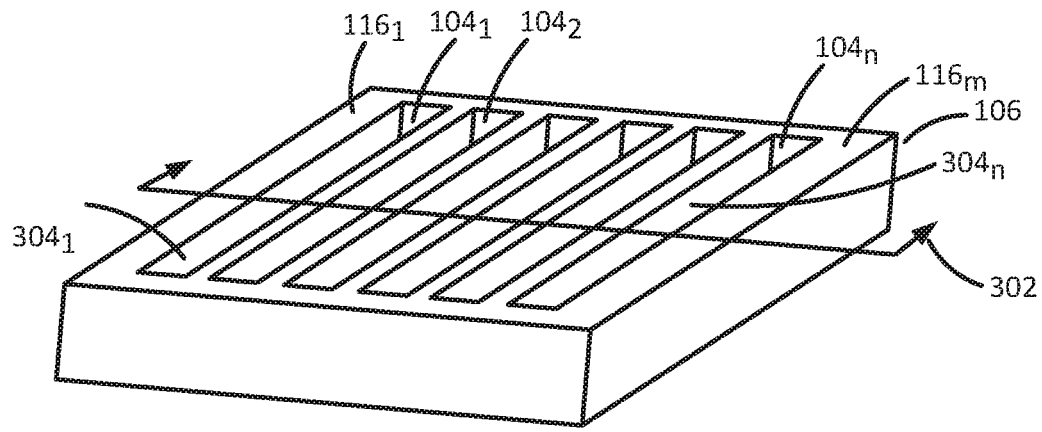
FIG. 3 illustrates an example isometric view of a grid of the present disclosure.

FIG. 3 illustrates an isometric view of the grid 106. The view illustrated in FIG. 1 may be a cross-sectional view of the grid 106 cut along a line 302 shown in FIG. 3. As can be seen in FIG. 3, the grid 106 may be a two dimensional polygon having openings 304$_1$ to 304$_n$ (hereinafter referred to individually as openings 304 or collectively as openings 304) where each one of the arrays 104 of LEDs 102 is located. Although FIG. 3 illustrates six openings 304 for six arrays 104 of LEDs 102, it should be noted that the grid 106 may have any number openings 304 and walls 116 based on a desired size of the display.

Referring back to FIG. 1, each array 104 may be coupled to a movable LED base 108. FIG. 1 illustrates the apparatus 100 when positioned in a normal viewing mode or a non-privacy mode. For example, a top or upper most point of the LEDs 102 of each array 104 may be approximately at a same level as a top most surface of each wall 116. In one example, a height 110 of each LED 102 may be approximately equal to a height 112 of each wall 116. As a result, when the movable LED base 108 is positioned in a normal viewing mode, the beam spread or viewing angle of each LED 102 may be the widest, providing a widest viewing angle of an image generated by the apparatus 100.

In one example, the grid 106 may be installed in a display such that the openings 304 are positioned vertically. For example, the first two openings 304 may be part of a left side of the display, the next two openings 304 may be a part of the center of the display and the last two openings 304 may be part of the right side of the display. However, it should be noted that the grid 106 may be deployed in any orientation that is appropriate for a particular display.

In one example, a user may want to enable a privacy mode. For example, an option to enable the privacy mode may be provided via a graphical user interface of a computing device associated with a display that contains the apparatus 100. In another example, a physical button may be provided on the display that contains the apparatus 100.

Figure 2:
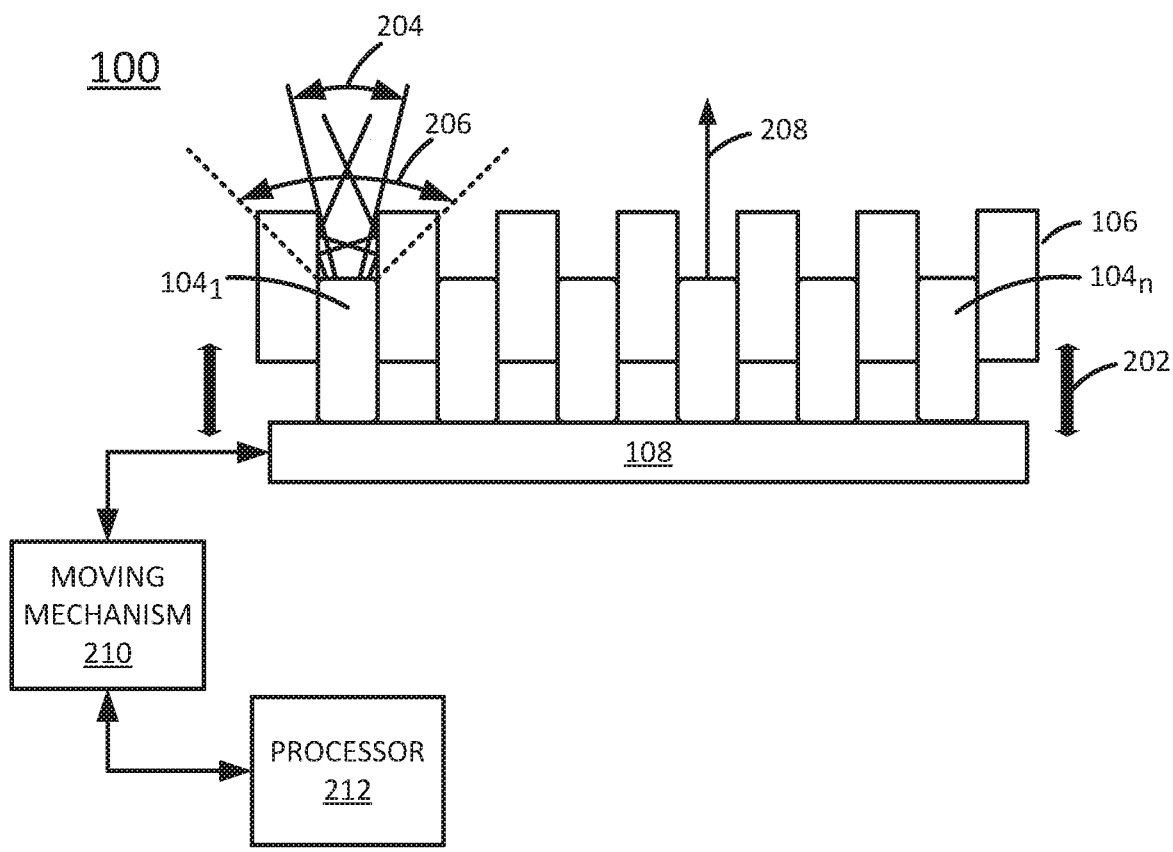
FIG. 2 is a block diagram of an example of an apparatus of the present disclosure in a privacy mode.

When a request to enable the privacy mode is received or detected, the movable LED base 108 may be moved into a privacy mode position as illustrated in FIG. 2. FIG. 2 illustrates an example of the apparatus 100 in a privacy mode position. For example, a moving mechanism 210 may be communicatively coupled to the movable LED base 108. A processor 212 may be communicatively coupled to the moving mechanism 210. The processor 212 may control the movement of the moving mechanism 210 to move the movable LED base 108 along a z-direction represented by arrows 202. In one example, the z-direction may be defined as being parallel to a central light emitting axis 208 of each LED 102 of each LED array 104.

The moving mechanism 210 may be any mechanical or electro-mechanical mechanism that can control movement of the moveable LED base 108 in the z-direction. For example, the moving mechanism 210 may be an elevator with a pneumatic control, a rotating track, a pulley system, and the like.

The moving mechanism 210 may move the movable LED base 108 up and down along the z-direction. At an upper most position as illustrated in FIG. 1, the movable LED base 108 may be in a non-privacy mode. As the movable LED base 108 is moved lower (e.g., the top surface of the LEDs 102 moves below a top surface of each wall 116) the viewing angle may become narrower, thereby reducing visibility of an image generated by the apparatus 100 at wider angles. In other words, the further down the movable LED base 108 is moved, the more centered a user should be to view the image generated by the apparatus 100 in a display.

FIG. 2 illustrates how a beam spread or viewing angle 204 is narrowed as the LED 102 moves further below a top surface of the wall 116. FIG. 2 illustrates a normal wider beam spread 206 represented by dashed lines of how the light would be emitted by the LED 102 without interference from the walls 116. In contrast, as the LEDs 102 move down below the walls 116, the light rays that are emitted at wider angles are reflected, or absorbed, by the walls 116. FIG. 2 illustrates an example of walls 116 that reflect the light emitted by the LEDs 102 at wider angles to be within the narrower beam spread 204.

In one example, a user may set a desired privacy viewing angle. The processor 212 may determine an amount of movement of the moveable LED base 108 to achieve the desired privacy viewing angle. Then, the processor 212 may control the moving mechanism 210 to cause the moving mechanism 210 to move the moveable LED base 108 by the determined amount. The desired privacy viewing angle may be measured by the beam spread 204 (for example, the angle formed by the beam spread 204 of light emitted by the LEDs at a given distance in the z-direction below top surface of the wall 116).

Figure 4:
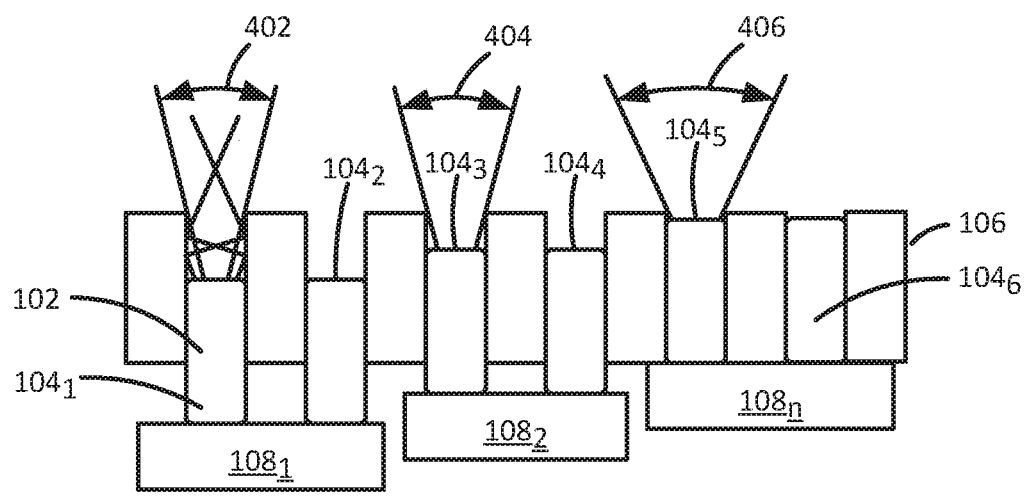
FIG. 4 illustrates a block diagram of independently movable LED bases of the present disclosure.

FIG. 4 illustrates an example apparatus 400. The apparatus 400 may be similar to the apparatus 100 except that the apparatus 400 includes a plurality of moveable LED bases $108_1$ to $108_n$, (hereinafter also referred to individually as a moveable LED base 108 or collectively as moveable LED bases 108). For example, each moveable LED base 108 may include at least one array 104 of LEDs 102. FIG. 4 illustrates an example where each moveable LED base 108 may include two arrays 104 of LEDs 102.

In one example, each moveable LED base $108_1$ to $108_n$ may be communicatively coupled to a moving mechanism that is communicatively coupled to a processor, similar to the moveable LED base 108 illustrated in FIG. 2. In one example, the plurality of different moveable LED bases $108_1$ to $108_n$ may allow different portions of a display to have different viewing angles. In other words, a privacy mode may be enabled for different portions of the display.

For example, a person may be sitting to the right of a user in a public area. However, the user may not want persons on the left of the display to view the information on the display. The user may selectively enable the privacy mode for the left portion of the display. As a result, the movable LED bases $108_1$ to $108_n$ may be incrementally moved downward from right to left to gradually increase the viewing angle moving from right to left across the display.

FIG. 4 illustrates the example described above as the moveable LED base $108_n$ may be positioned in a non-privacy mode, the moveable LED base $108_2$ may be moved in a z-direction lower than the moveable LED base $108_n$ and the moveable LED base $108_1$ may be moved below the LED base $108_2$. As a result, a beam spread 402 of the LEDs 102 of the arrays $104_1$ and $104_2$ coupled to the moveable LED base $108_1$ may be the narrowest (e.g., less than a beam spreads 404 and 406). The beam spread 404 of the LEDs 102 of the arrays $104_3$ and $104_4$ coupled to the moveable LED base $108_2$ may be wider than the beam spread 402, but less than the beam spread 406. The beam spread 406 of the LEDs 102 of the arrays $104_5$ and $104_6$ may be the widest (e.g., greater than the beam spreads 402 and 404).

In one example, the user may specify an amount of the display or which portion or portions of the display to enable the privacy mode. The processor (e.g., the processor 212) may determine an amount of movement for each one of the moveable LED bases $108_1$ to $108_n$ to achieve the desired privacy viewing angle in the specified portion or portions of the display.

In another example, the processor may simply move one of the moveable LED bases $108_1$ to $108_n$ into a privacy mode. For example, the moveable LED bases $108_1$ may represent a left side of the display, the moveable LED base $108_2$ may represent the center of the display, and the moveable LED base $108_n$ may represent a right side of the display. The user may request to enable a privacy mode on the right side of the display. As a result, the moveable LED base $108_n$ may be moved down to a desired viewing angle associated with the privacy mode. The moveable LED bases $108_1$ and $108_2$ may remain in a non-privacy mode where a maximum viewing angle is maintained.

Figure 5:
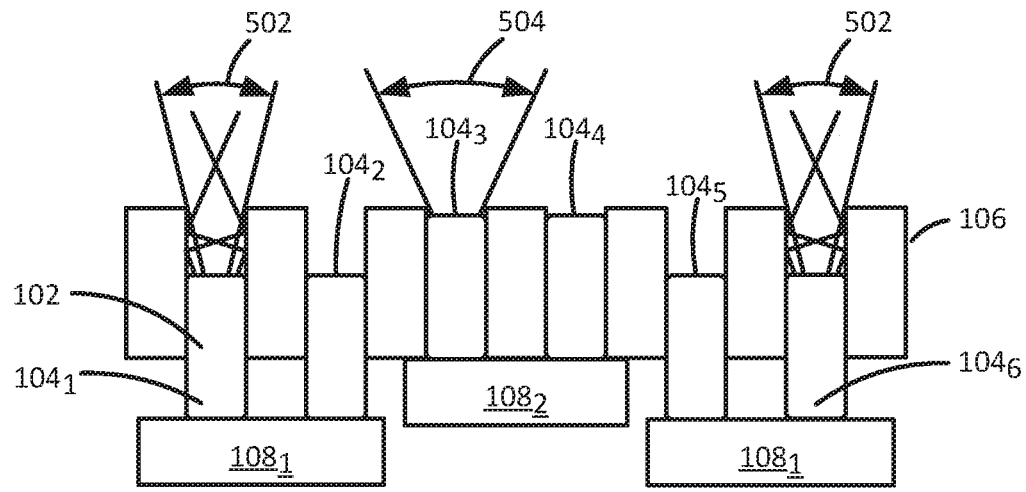
FIG. 5 illustrates a block diagram of different groups of independently movable LED bases of the present disclosure.

FIG. 5 illustrates an apparatus 500 that is similar to the apparatus 100 and 400 except that the moveable LED bases 108 may be grouped together. For example, the moveable LED bases $108_1$ may be communicatively coupled to form a first group of moveable LED bases $108_1$ and the moveable LED base $108_2$ may be a second group of moveable LED bases $108_2$, and so forth. The group of moveable LED bases $108_1$ may be moved to a privacy mode enabled position. A beam spread 502 of the light emitted from the LEDs 102 from the arrays 104 that are coupled to the group of moveable LED bases $108_1$ may be narrower than a beam spread 504 of the LEDs 102 from the arrays 104 that are coupled to the group of moveable LED bases $108_2$.

It should be noted that any number of moveable LED bases 108 may be grouped together. Each group of moveable LED bases 108 may have the same number or different number of moveable LED bases 108. In another example, two or more consecutive moveable LED bases 108 may form a group in sequential order. However, any pattern or sequence may be deployed to group the moveable LED bases 108.

Figure 6:
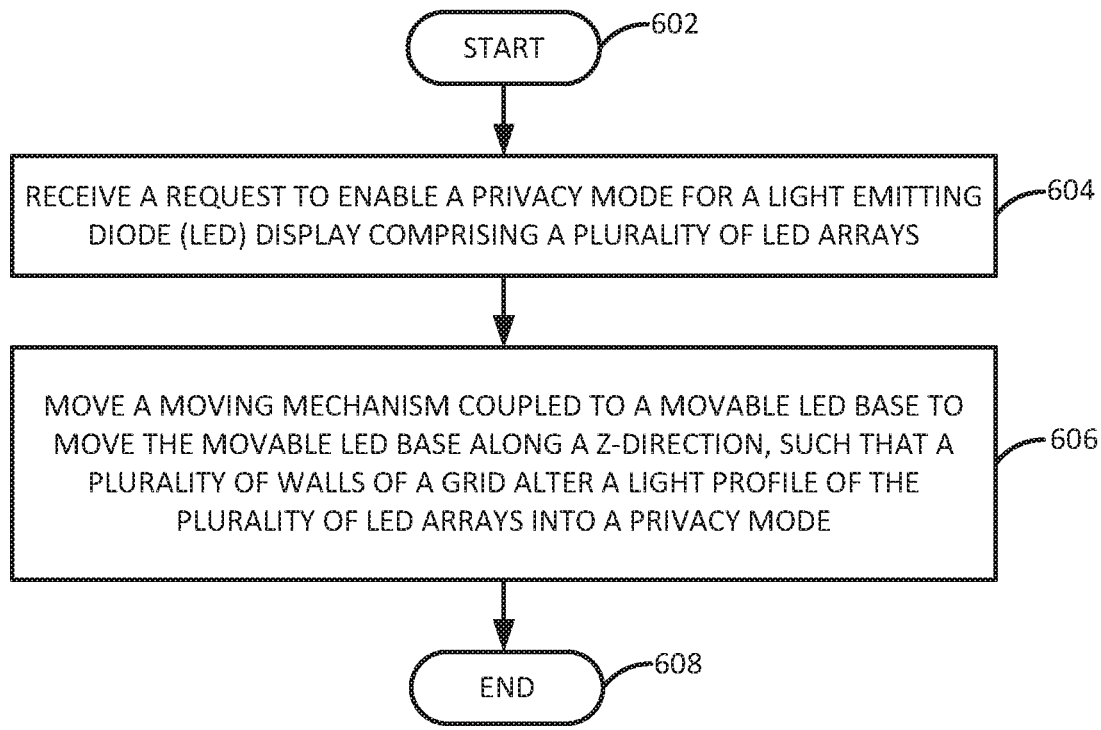
FIG. 6 is a flow chart of an example method for enabling a privacy mode of the present disclosure.

FIG. 6 illustrates a flow diagram of an example method 600 for enabling a privacy mode. In one example, the method 600 may be performed by the apparatus 100, 400, 500, or the apparatus 700 illustrated in FIG. 7, and discussed below.

At block 602, the method 600 begins. At block 604, the method 600 receives a request to enable a privacy mode for a light emitting diode (LED) display comprising a plurality of LED arrays. For example, the request may be received via a graphical user interface presented to a user. The user may enter a desired privacy viewing angle for the privacy mode. In another example, the privacy mode may have a predefined viewing angle and the request to turn the privacy mode on may set the desired privacy viewing angle to the predefined viewing angle. In one example, the request may specify to turn the privacy mode on for a specific portion of a display.

At block 606, the method 600 moves a moving mechanism coupled to a movable LED base to move the movable LED base along a z-direction, such that a plurality of walls of a grid alter a light profile of the plurality of LED arrays into a privacy mode. In one example, the method 600 may determine an amount of movement of the movable LED base along the z-direction to alter the light profile of the plurality of LED arrays to the desired privacy viewing angle. The method may then move the movable LED base by the determined amount of movement.

In another example, where the request specified a portion of the display to enter into a privacy mode, the method 600 may determine which movable LED bases coupled to respective LED arrays of the plurality of LED arrays are in the selected portion of the LED display. For example, if the request specified a left third of the display to enter into a privacy mode, the method 600 may determine which moveable LED bases are located in the left third of the display.

The method 600 may then determine an amount of movement of the moveable LED bases in the selected portion of the LED display in the z-direction to achieve the desired privacy viewing angle. Then, a moving mechanism coupled to the movable LED bases in the selected portion of the LED display may be moved by the determined amount. At block 608, the method 600 ends.

Figure 7:
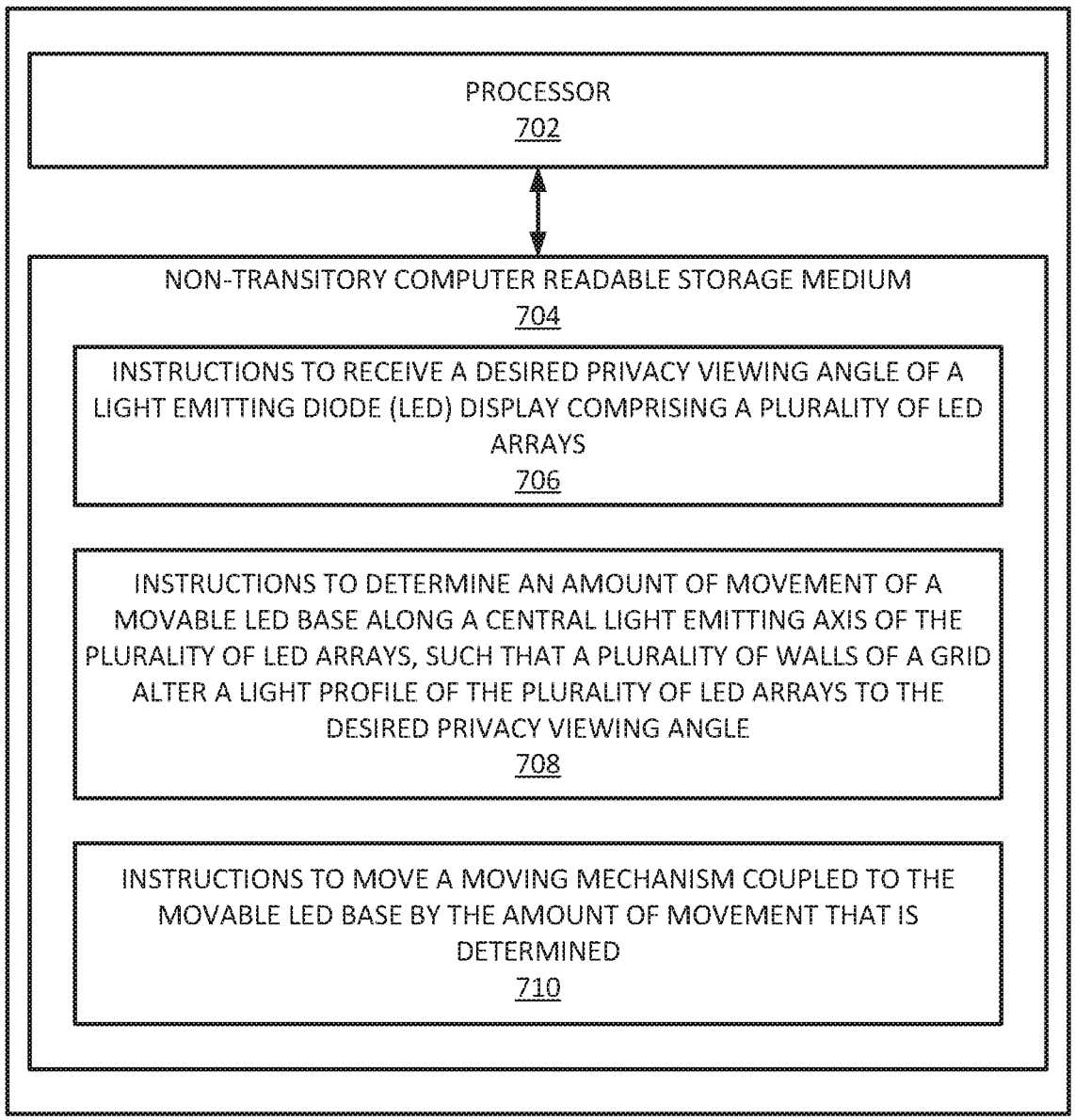
FIG. 7 is a block diagram of an example non-transitory computer readable storage medium storing instructions executed by a processor.

FIG. 7 illustrates an example of an apparatus 700. In one example, the apparatus 700 may be the apparatus 100, 400, or 500. In one example, the apparatus 700 may include a processor 702 and a non-transitory computer readable storage medium 704. The non-transitory computer readable storage medium 704 may include instructions 706, 708, and 710 that, when executed by the processor 702, cause the processor 702 to perform various functions.

The instructions 706 may include instructions to receive a desired privacy viewing angle of a light emitting diode (LED) display comprising a plurality of LED arrays. The instructions 708 may include instructions to determine an amount of movement of a movable LED base along a central light emitting axis of the plurality of LED arrays, such that a plurality of walls of a grid alter a light profile of the plurality of LED arrays to the desired privacy viewing angle. The instructions 710 may include instructions to move a moving mechanism coupled to the movable LED base by the amount of movement that is determined.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a movable light emitting diode (LED) base;
a plurality of LED arrays coupled to the movable LED base; and
a grid comprising a plurality of walls, wherein the grid is positioned such that each LED array of the plurality of LED arrays is adjacent to a wall of the plurality of walls, wherein the movable LED base causes at least one of the plurality of LED arrays to move in a z-direction along the plurality of walls of the grid to change a viewing angle as the movable LED base is moved.

2. The apparatus of claim 1, wherein the movable LED base moves in a direction along a central light emitting axis of each LED of the plurality of LED arrays.

3. The apparatus of claim 1, wherein the grid comprises an opaque material or a reflective material.

4. The apparatus of claim 1, wherein a height of the plurality of walls is equal to a height of each LED of the plurality of LED arrays.

5. The apparatus of claim 1, wherein the each LED array of the plurality of LED arrays is on an independently movable LED base.

6. The apparatus of claim 1, wherein the movable LED base comprises different movable LED bases and different groups of LED arrays of the plurality of LED arrays are on the different movable LED bases.

7. The apparatus of claim 1 further, comprising:
a processor communicatively coupled to a moving mechanism of the movable LED base.

8. The apparatus of claim 7, wherein the processor controls movement of the movable LED base to achieve a desired privacy viewing angle.

9. A method, comprising:
receiving, by a processor, a request to enable a privacy mode for a light emitting diode (LED) display comprising a plurality of LED arrays, wherein the request to enable the privacy mode comprises a desired privacy viewing angle of the LED display, wherein the desired privacy viewing angle of the LED display is for a selected portion of the LED display; and
moving, by the processor, a moving mechanism coupled to a movable LED base to move the movable LED base along a z-direction, such that a plurality of walls of a grid alter a light profile of the plurality of LED arrays into a privacy mode, wherein the moving comprises:
determining, by the processor, which movable LED bases coupled to respective LED arrays of the plurality of LED arrays are in the selected portion of the LED display;
determining, by the processor, an amount of movement of the movable LED bases along the z-direction; and
moving, by the processor, a moving mechanism coupled to the movable LED bases by the amount of movement that is determined.

10. The method of claim 9, further comprising:
determining, by the processor, an amount of movement of the movable LED base along the z-direction to alter the light profile of the plurality of LED arrays to the desired privacy viewing angle; and
moving, by the processor, the moving mechanism coupled to the movable LED base by the amount of movement that is determined.

11. A non-transitory computer readable storage medium encoded with instructions executable by a processor, the non-transitory computer-readable storage medium comprising:
instructions to receive a desired privacy viewing angle of a light emitting diode (LED) display comprising a plurality of LED arrays;
instructions to determine an amount of movement of a movable LED base along a central light emitting axis of the plurality of LED arrays, such that a plurality of walls of a grid alter a light profile of the plurality of LED arrays to the desired privacy viewing angle; and
instructions to move a moving mechanism coupled to the movable LED base by the amount of movement that is determined, wherein the movable LED base comprises a plurality of independently movable LED bases and the instructions to determine comprise instructions to determine an amount of movement for each one of the plurality of independently movable LED bases.

* * * * *